(12) United States Patent
Jang et al.

(10) Patent No.: US 10,647,918 B2
(45) Date of Patent: *May 12, 2020

(54) LIQUID CRYSTAL COMPOSITION AND DISPLAY DEVICE INCLUDING THE SAME

(71) Applicant: Samsung Display Co., Ltd., Yongin-si (KR)

(72) Inventors: Ji Eun Jang, Suwon-si (KR); Sun Young Kwon, Seoul (KR); Min-Hee Kim, Ansan-si (KR); Jong Ho Son, Seoul (KR); Keun Chan Oh, Hwaseong-si (KR); Chang-Hun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,790

(22) Filed: Aug. 23, 2018

(65) Prior Publication Data
US 2019/0085242 A1   Mar. 21, 2019

(30) Foreign Application Priority Data
Sep. 21, 2017  (KR) .......................... 10-2017-0121821

(51) Int. Cl.
| | | |
|---|---|---|
| G02F 1/1333 | (2006.01) | |
| C09K 19/30 | (2006.01) | |
| C09K 19/56 | (2006.01) | |
| C09K 19/32 | (2006.01) | |
| C09K 19/20 | (2006.01) | |
| C09K 19/12 | (2006.01) | |
| C09K 19/04 | (2006.01) | |

(52) U.S. Cl.
CPC .......... *C09K 19/3003* (2013.01); *C09K 19/20* (2013.01); *C09K 19/322* (2013.01); *C09K 19/56* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01)

(58) Field of Classification Search
CPC .. C09K 19/3003; C09K 19/20; C09K 19/322; C09K 19/56; C09K 2019/0448; C09K 2019/122; C09K 2019/3004; C09K 2019/3009; C09K 2019/301; C09K 2019/3016; G02F 1/1333
USPC .................................................... 252/299.63
See application file for complete search history.

(56) References Cited

U.S. PATENT DOCUMENTS

| | | | |
|---|---|---|---|
| 2008/0117379 A1 | 5/2008 | Kim et al. | |
| 2013/0335693 A1 | 12/2013 | Klassen-Memmer et al. | |
| 2015/0267118 A1 | 9/2015 | Park et al. | |
| 2019/0119572 A1* | 4/2019 | Kwon | C09K 19/3003 |

FOREIGN PATENT DOCUMENTS

KR   10-2015-0109543   10/2015

* cited by examiner

*Primary Examiner* — Geraldina Visconti
(74) *Attorney, Agent, or Firm* — H.C. Park & Associates, PLC

(57) ABSTRACT

A liquid crystal composition includes: at least one liquid crystal compound selected from the group consisting of Chemical Formulas 1-1 to 1-8; at least one self-aligned compound selected from the group consisting of Chemical Formulas 2-1 and 2-2; and at least one reactive mesogen selected from the group consisting of Chemical Formulas 3-1 to 3-5. Compositions and devices constructed therewith are capable of ameliorating liquid crystal drip spots that typically occur in a manufacturing process. In addition, the display devices using the composition do not require an additional alignment layer, which simplifies manufacturing.

18 Claims, 5 Drawing Sheets

| | 3min | 20min | 100min |
|---|---|---|---|
| Ref |  |  |  |
| Chemical formula 1-1 |  |  |  |
| Chemical formula 1-2 |  |  |  |
| Chemical formula 1-3 |  |  |  |
| Chemical formula 1-4 |  |  |  |
| Chemical formula 1-5 |  |  |  |
| Chemical formula 1-6 |  |  |  |
| Chemical formula 1-7 |  |  |  |

LIQUID CRYSTAL COMPOSITION AND DISPLAY DEVICE INCLUDING THE SAME

CROSS-REFERENCE TO RELATED APPLICATION

This application claims priority from and the benefit of Korean Patent Application No. 10-2017-0121821, filed on Sep. 21, 2017, which is hereby incorporated by reference for all purposes as if fully set forth herein.

BACKGROUND

Field

Exemplary embodiments of the invention relate generally to a liquid crystal composition and a display device including the same.

Discussion of the Background

A liquid crystal display is one of the most widely used display devices. The liquid crystal display generally includes two display panels on which an electric field generating electrode is disposed and a liquid crystal layer interposed therebetween. The liquid crystal display device generates an electric field in the liquid crystal layer by applying a voltage to the electric field generating electrode to orient the liquid crystal molecules and adjust the transmittance of light passing through the liquid crystal layer.

In a liquid crystal display device, a liquid crystal composition is very important for controlling light transmittance to obtain a desired image. As the use of liquid crystal displays becomes diversified, various characteristics such as low voltage driving, a high voltage holding ratio (VHR), wide viewing angle characteristics, a wide operating temperature range, high speed response, and prevention of spot generation are required.

The above information disclosed in this Background section is only for understanding of the background of the inventive concepts, and, therefore, it may contain information that does not constitute prior art.

SUMMARY

Compositions and devices constructed according to exemplary embodiments of the invention are capable of ameliorating liquid crystal drip spots that typically occur in a manufacturing process. In addition, the display devices according to exemplary embodiments of the invention have no additional alignment layer, which simplifies manufacturing.

An exemplary embodiment of the invention includes a liquid crystal composition that includes: at least one liquid crystal compound selected from the group consisting of Chemical Formulas 1-1 to 1-8; at least one self-aligned compound selected from the group consisting of Chemical Formulas 2-1 and 2-2; and at least one reactive mesogen selected from the group consisting of Chemical Formulas 3-1 to 3-5.

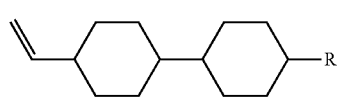
(Chemical Formula 1-1)

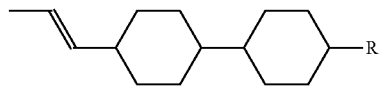
(Chemical Formula 1-2)

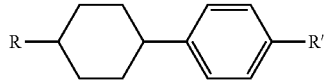
(Chemical Formula 1-3)

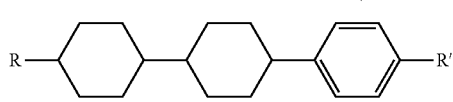
(Chemical Formula 1-4)

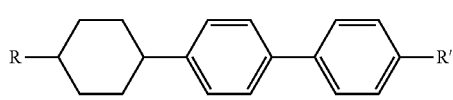
(Chemical Formula 1-5)

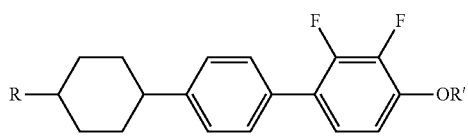
(Chemical Formula 1-6)

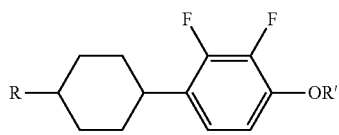
(Chemical Formula 1-7)

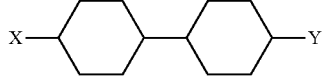
(Chemical Formula 1-8)

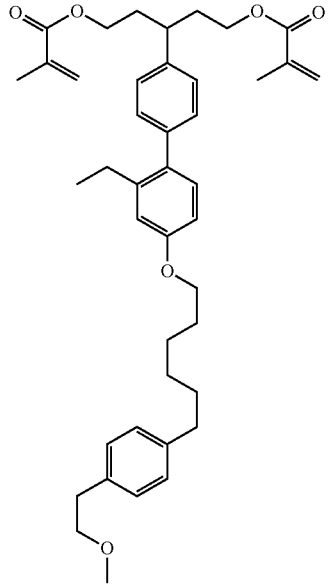
(Chemical Formula 2-1)

(Chemical Formula 2-2)

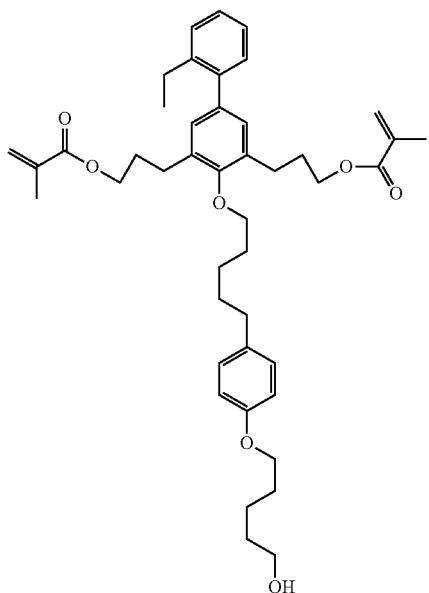

(Chemical Formula 3-1)

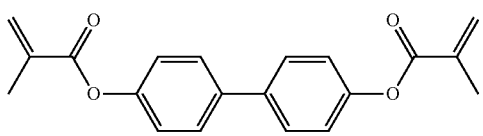

(Chemical Formula 3-2)

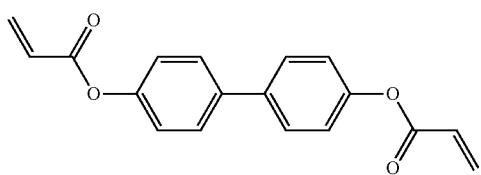

(Chemical Formula 3-3)

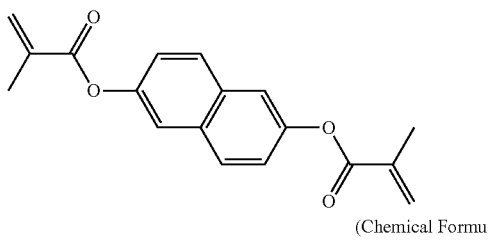

(Chemical Formula 3-4)

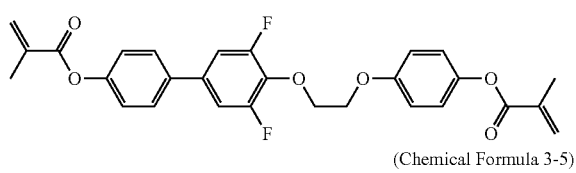

(Chemical Formula 3-5)

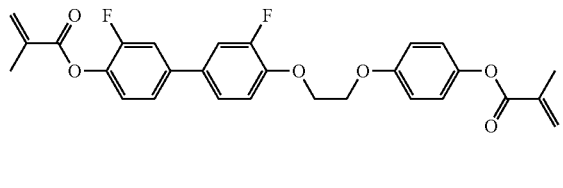

Herein, R and R' independently denote a C1 to C8 alkyl group, alkenyl group, or alkoxy group in Chemical Formulas 1-1 to 1-7, and X and Y independently denote a C1 to C8 alkyl group in Chemical Formula 1-8.

A content of the liquid crystal compound represented by Chemical Formula 1-1 may be 0 to 1 wt % of the entire liquid crystal composition, a content of the liquid crystal compound represented by Chemical Formula 1-2 may be 0 to 1 wt % of the entire liquid crystal composition, a content of the liquid crystal compound represented by Chemical Formula 1-3 may be 3 to 10 wt % of the entire liquid crystal composition, a content of the liquid crystal compound represented by Chemical Formula 1-4 may be 3 to 20 wt % of the entire liquid crystal composition, a content of the liquid crystal compound represented by Chemical Formula 1-5 may be 3 to 20 wt % of the entire liquid crystal composition, a content of the liquid crystal compound represented by Chemical Formula 1-6 may be 3 to 20 wt % of the entire liquid crystal composition, a content of the liquid crystal compound represented by Chemical Formula 1-7 may be 10 to 30 wt % of the entire liquid crystal composition, and a content of the liquid crystal compound represented by Chemical Formula 1-8 may be 3 to 30 wt % of the entire liquid crystal composition.

A content of the self-aligned compound may be 0.05 wt % to 3 wt % of the entire liquid crystal composition.

A content of the reactive mesogen may be 0.05 wt % to 3 wt % of the entire liquid crystal composition.

The liquid crystal composition may have a refractive anisotropy of 0.08 to 0.13, a rotational viscosity of 70 to 150, and a dielectric anisotropy of −2.8 to −5.5.

The at least one liquid crystal compound may be selected from the group consisting of Chemical Formulas 1-3 to 1-8.

An absolute value of average interaction energy between the self-aligned compound and one of the liquid crystal compounds represented by Chemical Formulas 1-1 to 1-3 may be less than an absolute value of average interaction energy between the self-aligned compound and one of the liquid crystal compounds represented by Chemical Formulas 1-4 to 1-8.

An absolute value of average interaction energy between the self-aligned compound and one of the liquid crystal compounds represented by Chemical Formulas 1-1 to 1-3 may be smaller than an absolute value of average interaction energy between the self-aligned compound and one of the liquid crystal compounds represented by Chemical Formula 1-4 and Chemical Formula 1-5.

An exemplary embodiment of the invention includes a display device that includes: a first substrate and a second substrate configured to face and overlap each other; and a liquid crystal layer disposed between the first substrate and the second substrate, wherein the liquid crystal layer includes: at least one liquid crystal compound selected from the group consisting of Chemical Formulas 1-1 to 1-8; at least one self-aligned compound selected from the group consisting of Chemical Formulas 2-1 to 2-2; and at least one reactive mesogen selected from the group consisting of Chemical Formulas 3-1 to 3-5, wherein an absolute value of average interaction energy between the self-aligned compound and one of the liquid crystal compounds represented by Chemical Formulas 1-1 to 1-3 is less than an absolute value of average interaction energy between the self-aligned compound and one of the liquid crystal compounds represented by Chemical Formulas 1-4 to 1-8.

(Chemical Formula 1-1)

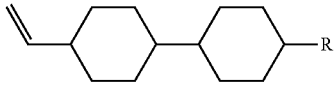

(Chemical Formula 1-2)

(Chemical Formula 1-3)

(Chemical Formula 1-4)

(Chemical Formula 1-5)

(Chemical Formula 1-6)

(Chemical Formula 1-7)

(Chemical Formula 1-8)

(Chemical Formula 2-1)

(Chemical Formula 2-2)

(Chemical Formula 3-1)

(Chemical Formula 3-2)

(Chemical Formula 3-3)

(Chemical Formula 3-4)

(Chemical Formula 3-5)

Herein, R and R' independently denote a C1 to C8 alkyl group, alkenyl group, or alkoxy group in Chemical Formulae 1-1 to 1-7, and X and Y independently denote a C1 to C8 alkyl group in Chemical Formula 1-8.

In the display device the self-aligned compound may be disposed between the first substrate and the liquid crystal layer and may be disposed between the second substrate and the liquid crystal layer, to vertically align a plurality of liquid crystal molecules included in the liquid crystal layer.

In the display device, the reactive mesogen may be disposed between the first substrate and the liquid crystal layer and may be disposed between the second substrate and the liquid crystal layer, to align a plurality of liquid crystal molecules included in the liquid crystal layer in an inclined manner with respect to a direction perpendicular to the first substrate.

In the display device for an entire liquid crystal composition of the liquid crystal layer, a content of the liquid crystal compound represented by Chemical Formula 1-1 may be 0 to 1 wt % of the entire liquid crystal composition, a content of the liquid crystal compound represented by Chemical Formula 1-2 may be 0 to 1 wt % of the entire liquid crystal composition, a content of the liquid crystal compound represented by Chemical Formula 1-3 may be 3 to 10 wt % of the entire liquid crystal composition, a content of the liquid crystal compound represented by Chemical Formula 1-4 may be 3 to 20 wt % of the entire liquid crystal composition, a content of the liquid crystal compound represented by Chemical Formula 1-5 may be 3 to 20 wt % of the entire liquid crystal composition, a content of the liquid crystal compound represented by Chemical Formula 1-6 may be 3 to 20 wt % of the entire liquid crystal composition, a content of the liquid crystal compound represented by Chemical Formula 1-7 may be 10 to 30 wt % of the entire liquid crystal composition, and a content of the liquid crystal compound represented by Chemical Formula 1-8 may be 3 to 30 wt % of the entire liquid crystal composition.

In the display device, for an entire liquid crystal composition of the liquid crystal layer, a content of the self-aligned compound may be 0.05 wt % to 3 wt % of the entire liquid crystal composition.

In the display device, for an entire liquid crystal composition of the liquid crystal layer, a content of the reactive mesogen may be 0.05 wt % to 3 wt % of the entire liquid crystal composition.

In the display device, for an entire liquid crystal composition of the liquid crystal layer, the liquid crystal composition may have a refractive anisotropy of 0.08 to 0.13, a rotational viscosity of 70 to 150, and a dielectric anisotropy of −2.8 to −5.5.

In the display device, the at least one liquid crystal compound may be selected from the group consisting of Chemical Formulas 1-3 to 1-8.

In the display device, an absolute value of average interaction energy between the self-aligned compound and one of the liquid crystal compounds represented by Chemical Formulas 1-1 to 1-3 may be less than an absolute value of average interaction energy between the self-aligned compound and one of the liquid crystal compounds represented by Chemical Formula 1-4 and Chemical Formula 1-5.

In the display device, an alignment layer may not be disposed between the first substrate and the liquid crystal layer and may not be disposed between the second substrate and the liquid crystal layer.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
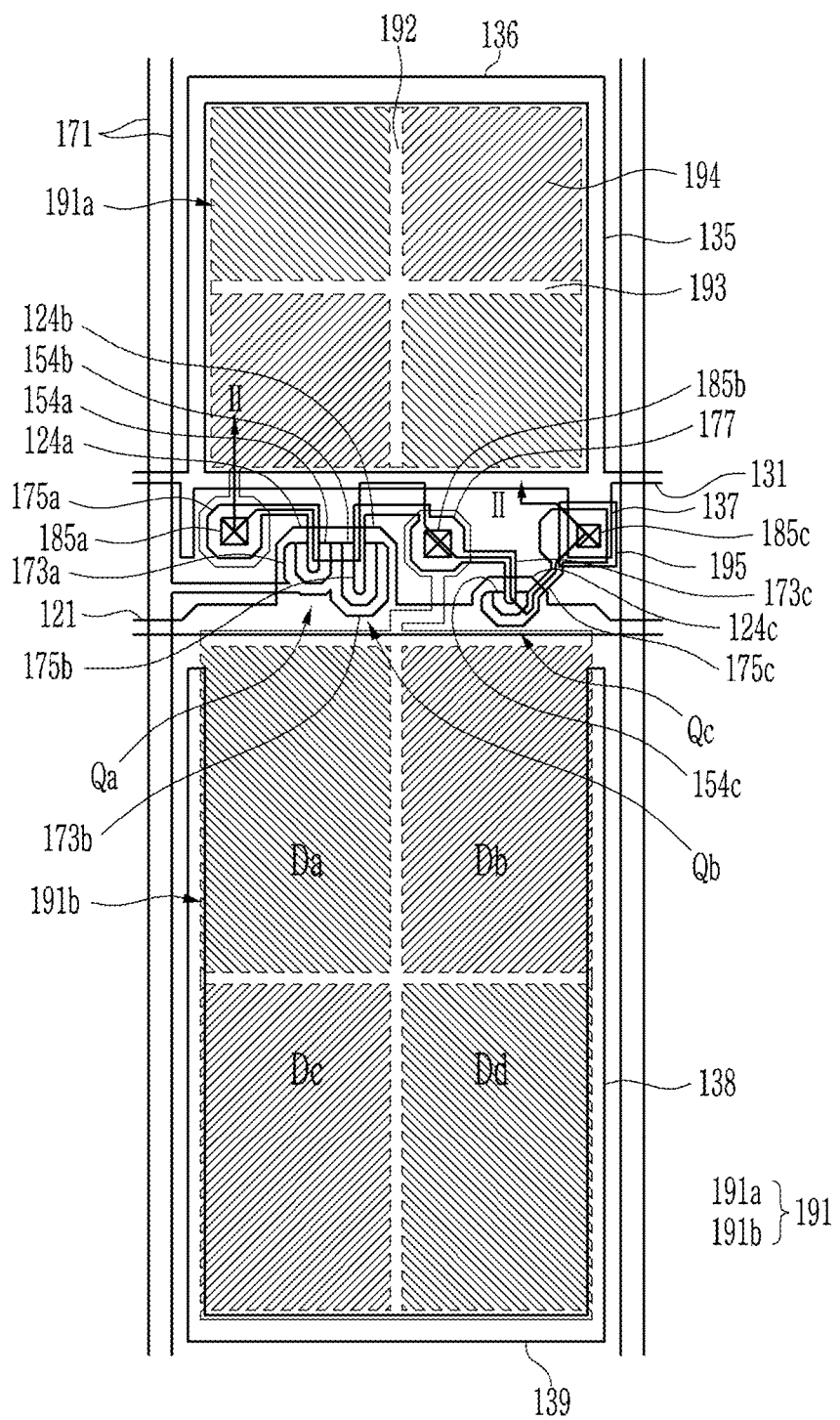
FIG. 1 is a top plan view illustrating a pixel according to an exemplary embodiment of the invention.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order.

For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z," "at least one selected from the group consisting of X, Y, and Z," and "at least one element selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Further, the phrase "in a plan view" means when an object portion is viewed from above, and the phrase "in a cross-sectional view" means when a cross-section taken by vertically cutting an object and the cut portion is viewed from the side where the cut occurred.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
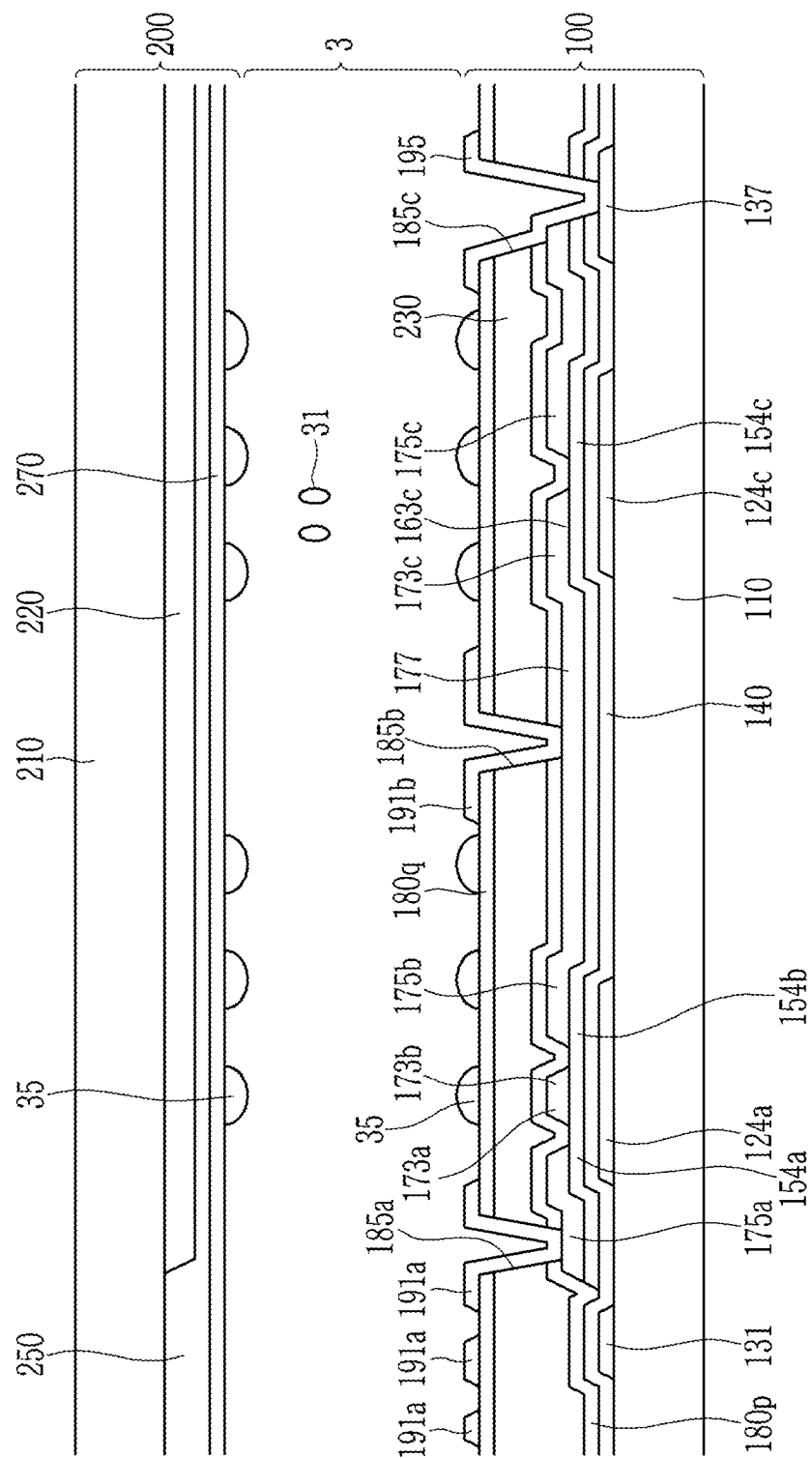
FIG. 2 is a cross-sectional view taken along a line II-II of FIG. 1.

Hereinafter, according to an exemplary embodiment of the invention, a liquid crystal composition and a display device including the liquid crystal composition will be described with reference to FIG. 1 and FIG. 2. FIG. 1 is a top plan view illustrating a pixel according to an exemplary embodiment of the invention, and FIG. 2 is a cross-sectional view taken along a line II-II of FIG. 1.

First, the liquid crystal composition according to an exemplary embodiment will be described.

The liquid crystal composition according to an exemplary embodiment includes at least one of following liquid crystal compounds represented by Chemical Formulas 1-1 to 1-8, at least one of following self-aligned compounds represented by Chemical Formulas 2-1 to 2-2, and at least one of following reactive mesogens (RM) represented by Chemical Formulas 3-1 to 3-5.

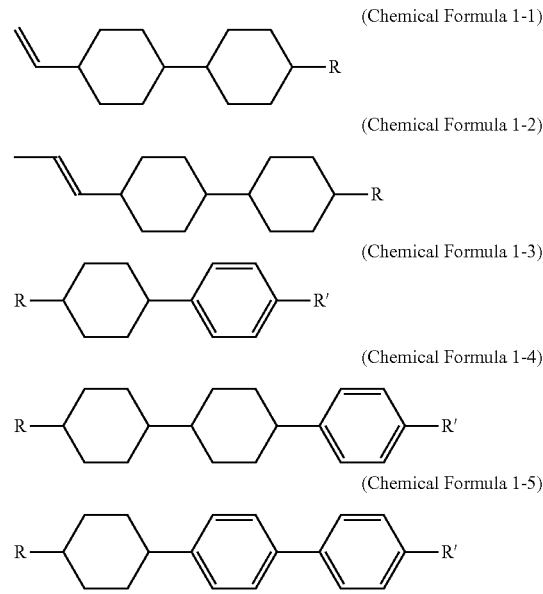

-continued (Chemical Formula 1-6)
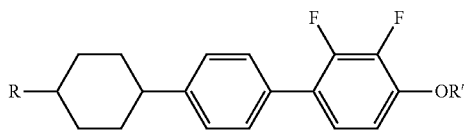

(Chemical Formula 1-7)
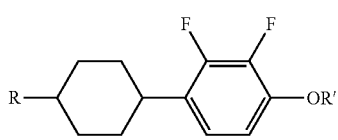

(Chemical Formula 1-8)
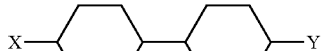

(Chemical Formula 2-1)
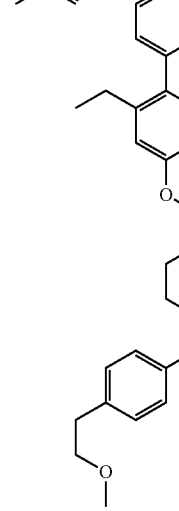

(Chemical Formula 2-2)
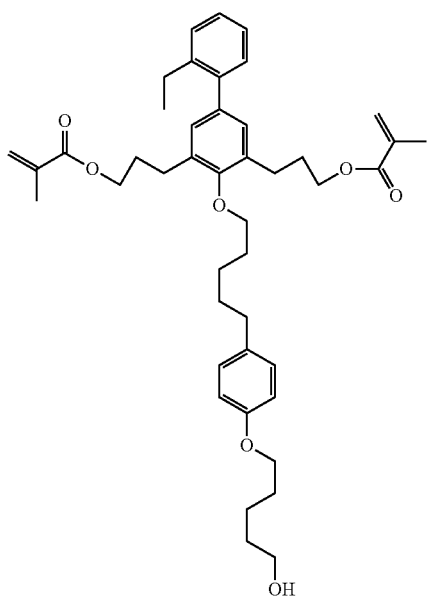

-continued (Chemical Formula 3-1)
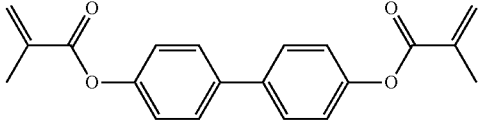

(Chemical Formula 3-2)
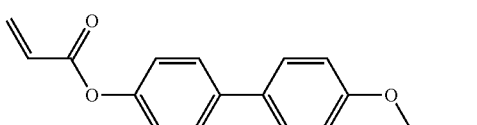

(Chemical Formula 3-3)
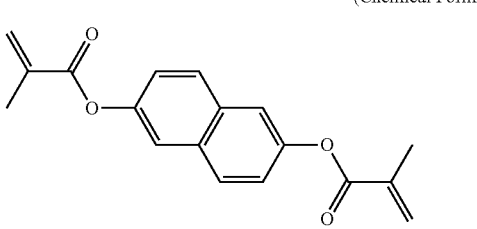

(Chemical Formula 3-4)
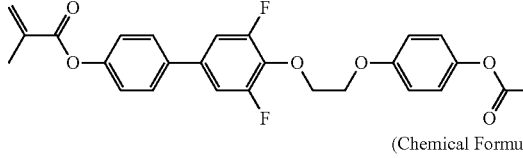

(Chemical Formula 3-5)
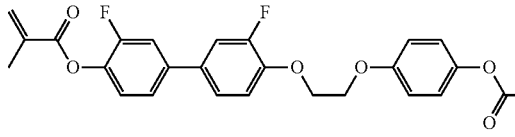

Herein, R and R' independently denote a C1 to C8 alkyl group, or an alkenyl group or alkoxy group in Chemical Formulas 1-1 to 1-7, and X and Y independently denote a C1 to C8 alkyl group.

A content of the liquid crystal compound represented by Chemical Formula 1-1 is 0 to 1 wt % of the entire liquid crystal composition, a content of the liquid crystal compound represented by Chemical Formula 1-2 is 0 to 1 wt % of the entire liquid crystal composition, a content of the liquid crystal compound represented by Chemical Formula 1-3 is 3 to 10 wt % of the entire liquid crystal composition, a content of the liquid crystal compound represented by Chemical Formula 1-4 is 3 to 20 wt % of the entire liquid crystal composition, a content of the liquid crystal compound represented by Chemical Formula 1-5 is 3 to 20 wt % of the entire liquid crystal composition, a content of the liquid crystal compound represented by Chemical Formula 1-6 is 3 to 20 wt % of the entire liquid crystal composition, a content of the liquid crystal compound represented by Chemical Formula 1-7 is 10 to 30 wt % of the entire liquid crystal composition, and a content of the liquid crystal compound represented by Chemical Formula 1-8 is 3 to 30 wt % of the entire liquid crystal composition. The liquid crystal composition according to an exemplary embodiment may not include the liquid crystal compounds represented by Chemical Formula 1-1 and Chemical Formula 1-2.

The liquid crystal composition according to an exemplary embodiment may have refractive anisotropy of 0.08 to 0.13, rotational viscosity of 70 to 150, and dielectric anisotropy of −2.8 to −5.5. The liquid crystal composition may satisfy the aforementioned physical properties in the content range.

The self-aligned compound according to an exemplary embodiment may align the liquid crystal molecules perpendicularly to a first substrate or a second substrate to be described without an additional alignment layer. A content of the self-aligned compound for perpendicularly aligning the liquid crystal molecules may be 0.05 wt % to 3 wt % of the entire liquid crystal composition.

The self-aligned compound according to an exemplary embodiment may align the liquid crystal molecules in an inclined manner with respect to a direction perpendicular to the first substrate or the second substrate. A content of the reactive mesogens for pretilting the liquid crystal molecules may be 0.05 wt % to 3 wt % of the entire liquid crystal composition.

Interaction energy that will be described hereinafter is an energy value derived in consideration of an average π-π interaction between the liquid crystal compound and a benzene ring included in the self-aligned compound. The average interaction energy may be represented by Equation 1 (Eq. 1).

$$\text{Average interaction energy} = (E_{2\text{-}1} * 0.2 + E_{2\text{-}2} * 0.6)/0.8 \quad \text{Eq. 1}$$

In Eq. 1, $E_{2\text{-}1}$ indicates interaction energy between a liquid crystal compound and the self-aligned compound represented by Chemical Formula 2-1, and $E_{2\text{-}2}$ indicates interaction energy between a liquid crystal compound and the self-aligned compound represented by Chemical Formula 2-2.

An absolute value of average interaction energy between the self-aligned compound and the liquid crystal compounds represented by Chemical Formulas 1-1 to 1-3 may be different from an absolute value of average interaction energy between the self-aligned compound and the liquid crystal compounds represented by Chemical Formulas 1-4 to 1-8.

For example, the absolute value of the average interaction energy between the self-aligned compound and the liquid crystal compounds represented by Chemical Formulas 1-1 to 1-3 may be smaller than the absolute value of the average interaction energy between the self-aligned compound and the liquid crystal compounds represented by Chemical Formulas 1-4 to 1-8.

As a detailed example, an absolute value of average interaction energy between the self-aligned compound and one of the liquid crystal compounds represented by Chemical Formula 1-1 and Chemical Formula 1-3 may be smaller than an absolute value of average interaction energy between the self-aligned compound and one of the liquid crystal compounds represented by Chemical Formula 1-4 and Chemical Formula 1-5. Detailed average interaction energy values may be shown in Table 1.

TABLE 1

|  | Interaction energy (eV) with self-aligned compound represented by CF 2-1 | Interaction energy (eV) with self-aligned compound represented by CF 2-1 | Average interaction energy (eV) |
| --- | --- | --- | --- |
| Liquid crystal compound represented by CF 1-1 | −0.74 | −0.92 | −0.878 |
| Liquid crystal compound represented by CF 1-3 | −0.59 | −0.82 | −0.766 |

TABLE 1-continued

|  | Interaction energy (eV) with self-aligned compound represented by CF 2-1 | Interaction energy (eV) with self-aligned compound represented by CF 2-1 | Average interaction energy (eV) |
| --- | --- | --- | --- |
| Liquid crystal compound represented by CF 1-4 | −0.54 | −1.06 | −0.931 |
| Liquid crystal compound represented by CF 1-5 | −0.65 | −1.05 | −0.930 |

Herein, "CF" indicates Chemical Formula. The liquid crystal composition according to an exemplary embodiment may be dripped onto a substrate in a process of bonding the first substrate and the second substrate. The dripped liquid crystal composition needs to be uniformly spread on the substrate.

As described above, the liquid crystal compounds represented by Chemical Formulas 1-1 to 1-3 may have a weak bonding force with the self-aligned compound. The self-aligned compound may have strong adsorptive power with the substrate, and may exhibit a property of being adsorbed to the substrate at the same time as it is dripped onto the substrate. The self-aligned compound may exhibit an aggregated form without spreading evenly over the substrate. When the self-aligned compound does not spread uniformly over the substrate to have low spreadability, spots may occur in a region where the liquid crystal composition is dripped.

The liquid crystal compounds represented by Chemical Formulas 1-4 to 1-8, e.g., Chemical Formula 1-4 and 1-5, may have a relatively greater absolute value of interaction energy with the self-aligned compound. The self-aligned compound may be bonded to the liquid crystal compound represented by Chemical Formulas 1-4 to 1-8 rather than being adsorbed on the substrate. The self-aligned compound mixed with the liquid crystal composition including the liquid crystal compounds represented by Chemical Formulas 1-4 to 1-8 may uniformly spread on the substrate without being adsorbed into the substrate, in a process where the liquid crystal composition is dripped. The liquid crystal composition containing the liquid crystal compounds represented by Chemical Formulas 1-4 to 1-8 in a predetermined content may prevent spot generation as the self-aligned compound is adsorbed onto the substrate.

The liquid crystal composition according to an exemplary embodiment may contain the liquid crystal compounds represented by Chemical Formula 1-1 and Chemical Formula 1-2 in an extremely small amount at a content ratio of the total liquid crystal compound of 0 to about 1 wt %. In addition, the liquid crystal compound represented by Chemical Formula 1-3 may be contained at a small content of about 3 wt % to about 10 wt % as compared with a total content of the liquid crystal compounds. Further, the liquid crystal compounds represented by Chemical Formulas 1-4 to 1-8 may be contained at a content of about 3 wt % to 30 wt % with respect to the entire liquid crystal composition, thereby preventing the self-aligned compound from being adsorbed onto the substrate and providing uniform spreadability.

The liquid crystal composition according to an exemplary embodiment may not contain an additional alignment layer through the self-aligned compound, and the liquid crystal composition containing the self-aligning compound may be uniformly positioned on the substrate.

Hereinafter, a display device containing the aforementioned liquid crystal composition will be described with reference to FIG. 1 and FIG. 2. First, the lower display panel 100 will be described.

A gate conductor including a gate line 121 and a reference voltage line 131 is disposed on a first substrate 110.

The gate line 121 includes a first gate electrode 124a, a second gate electrode 124b, and a third gate electrode 124c. The reference voltage line 131 includes first storage electrodes 135 and 136 and a reference electrode 137. Second storage electrodes 138 and 139 may be disposed to overlap a second subpixel electrode 191b without being connected with the reference voltage line 131.

A gate insulating layer 140 is disposed on the gate line 121 and the reference voltage line 131.

A first semiconductor layer 154a, a second semiconductor layer 154b, and a third semiconductor layer 154c are disposed on the gate insulating layer 140. Although not illustrated in FIG. 2, an ohmic contact may be disposed on the first, second and third semiconductor layers 154a, 154b, and 154c according to an exemplary embodiment.

A data conductor including data lines 171 connected with a first source electrode 173a and a second source electrode 173b, a first drain electrode 175a, a second drain electrode 175b, a third source electrode 173c, and a third drain electrode 175c is disposed on the gate insulating layer 140 and the semiconductor layers 154a, 154b, and 154c.

The first gate electrode 124a, the first source electrode 173a, and the first drain electrode 175a constitute a first thin film transistor Qa together with the first semiconductor layer 154a, the second gate electrode 124b, the second source electrode 173b, and the second drain electrode 175b constitute a second thin film transistor Qb together with the second semiconductor layer 154b, and the third gate electrode 124c, the third source electrode 173c, and the third drain electrode 175c constitute a third thin film transistor Qc together with the third semiconductor layer 154c.

The second drain electrode 175b is connected to the third source electrode 173c with a wide extension 177.

A first passivation layer 180p is disposed on the data conductor 171, 173a, 173b, 173c, 175a, 175b, 175c, and 177 and the semiconductor layers 154a, 154b, and 154c. The first passivation layer 180p may include an organic insulator or an inorganic insulating layer such as a silicon nitride or a silicon oxide.

A color filter 230 is disposed on the first passivation layer 180p. The color filter 230 extends along two data lines 171 adjacent to each other in a vertical direction. The present exemplary embodiment describes and illustrates that the color filter 230 is disposed in the lower display panel 100. However, according to an exemplary embodiment, the color filter may be disposed in an upper display panel 200 instead of the lower display panel 100.

A second passivation layer 180q disposed on the color filter 230. Identical to the first passivation layer 180p, the second passivation layer 180q may include an organic insulator or an inorganic insulating layer such as a silicon nitride or a silicon oxide.

The second passivation layer 180q prevents the color filter 230 from being lifted and suppresses contamination of the liquid crystal layer 3 due to an organic material such as a solvent having flowed from the color filters 230, thereby preventing an abnormality such as a residual image from occurring when a screen is driven.

The first passivation layer 180p, the color filter 230, and the second passivation layer 180q may have a first contact hole 185a and a second contact hole 185b. The first drain electrode 175a and the second drain electrode 175b are respectively electrically connected to the first subpixel electrode 191a and the second subpixel electrode 191b through the first contact hole 185a and the second contact hole 185b.

The first passivation layer 180p, the color filter 230, the second passivation layer 180q, and the gate insulating layer 140 may have a third contact hole 185c, and a connecting member 195 is disposed in the third contact hole 185c. The connecting member 195 may electrically connect the reference electrode 137 to the third drain electrode 175c.

A pixel electrode 191 is disposed on the second passivation layer 180q. The pixel electrode 191 is one of the field generating electrodes. The pixel electrode 191 includes a first subpixel electrode 191a and the second subpixel electrode 191b that are separated from each other with the gate line 121 therebetween, and are adjacent in a column direction based on the gate line 121.

The pixel electrode 191 may be formed of a transparent material such as indium tin oxide (ITO) and indium zinc oxide (IZO).

An overall shape of the first subpixel electrode 191a and the second subpixel electrode 191b is a rectangle. Each of the first subpixel electrode 191a and the second subpixel electrode 191b includes a cross-shaped stem including a horizontal stem 193 and a vertical stem 192 orthogonal thereto. In addition, each of the first subpixel electrode 191a and the second subpixel electrode 191b is divided into a first subregion Da, a second subregion Db, a third subregion Dc, and a fourth subregion Dd by the horizontal stem 193 and the vertical stem 192, and includes a plurality of minute branches 194 disposed at each of the subregions Da-Dd.

The first subpixel electrode 191a and the second subpixel electrode 191b receive data voltages from the first drain electrode 175a and the second drain electrode 175b, respectively. In this case, some of the data voltage applied to the second drain electrode 175b is divided through the third source electrode 173c, so that a size of the voltage applied to the first subpixel electrode 191a may be larger than that of the voltage applied to the second subpixel electrode 192b.

The first subpixel electrode 191a and the second subpixel electrode 191b to which the data voltage is applied generate an electric field together with a common electrode 270 of the upper display panel 200 to determine a direction of the liquid crystal molecules of the liquid crystal layer 3 between the two electrodes 191 and 270. The luminance of light passing through the liquid crystal layer 3 is changed according to the determined direction of the liquid crystal molecules.

The description of the above-described thin film transistor and the pixel electrode 191 is only one example. The structure of the thin film transistor and the design of the pixel electrode may be changed to improve lateral visibility.

Next, the second display panel 200 including a second substrate 210 will now be described. The second substrate 210 and the first substrate 110 are spaced apart from each other to overlap each other. A liquid crystal layer 3 may be disposed between the first substrate 110 and the second substrate 210.

A light blocking member 220 and an overcoat 250 are sequentially disposed between the second substrate 210 and the liquid crystal layer 3. The overcoat 250 may be omitted according to an exemplary embodiment.

The light blocking member 220 may include a pigment such as carbon black and a photosensitive organic material. The present application describes and illustrates the exemplary embodiment in which the light blocking member 220 is disposed in the upper display panel 200, but is not limited thereto. According to an exemplary embodiment, the light blocking member may be disposed in the lower display panel 100.

The common electrode 270 serving as one of the field generating electrodes is disposed between the overcoat 250 and the liquid crystal layer 3. The common electrode 270 generates an electric field together with the pixel electrode 191 of the first display panel 100 to determine an orientation of liquid crystal molecules 31 of the liquid crystal layer 3.

The liquid crystal layer 3 including the liquid crystal molecules 31 is positioned between the lower display panel 100 and the upper display panel 200. The liquid crystal layer 3 may have negative dielectric anisotropy and may include the liquid crystal composition according to the aforementioned exemplary embodiments.

The self-aligned compound and the reactive mesogen included in the liquid crystal composition described above may be positioned in a form of a protrusion 35 between the liquid crystal layer 3 and the first substrate 110 and between the liquid crystal layer 3 and the second substrate 210.

According to the an exemplary embodiment, the protrusion 35 may include at least one of a self-aligned compound polymer, a reactive mesogen, a self-aligned compound, and a reactive mesogen polymer formed by irradiating the aforementioned liquid crystal composition with light.

The self-aligned compound may align the liquid crystal molecules 31 perpendicular to the first substrate 110 or the second substrate 210. The display device according to the exemplary embodiment of the invention does not include an additional alignment layer. The liquid crystal molecules 31 may be aligned perpendicular to the first substrate 110 or the second substrate 210 through the self-aligned compound without an alignment layer.

The reactive mesogen may be disposed on the pixel electrode 191 or the common electrode 270, or may be included in the liquid crystal layer 3 in a form of a polymer cured by polymerization with light such as ultraviolet rays or in a form of a compound represented by Chemical Formulas 3-1 to 3-5. The reactive mesogen may align the liquid crystal molecules 31 included in the liquid crystal layer 3 in an inclined manner with respect to a direction perpendicular to the first substrate 110 or the second substrate 210.

According to such a display device, the manufacturing process may be simplified by including a self-aligning compound without including an additional alignment layer. In addition, the liquid crystal composition described above may help uniform spreading of the self-aligned compound, thereby reducing drip spots that occur in the display device.

Figure 3:
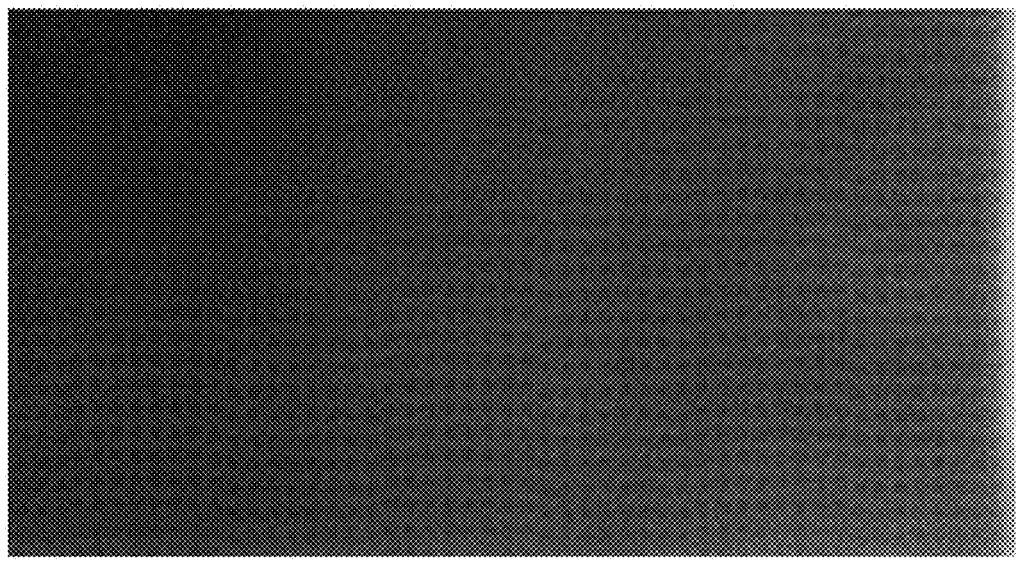
FIG. 3 illustrates an image of spots that occur in a drip process of a liquid crystal composition according to conventional compositions.
Figure 4:
FIG. 4 illustrates images according to adsorption rates of each liquid crystal compound and self-aligned compound in accordance with exemplary embodiments.
Figure 4:
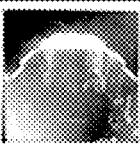
Figure 4:
Figure 4:
Figure 4:
Figure 4:
Figure 4:
Figure 4:
Figure 4:
Figure 4:
Figure 4:
Figure 4:
Figure 4:
Figure 4:
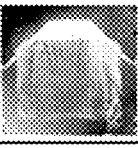
Figure 4:
Figure 4:
Figure 4:
Figure 4:
Figure 4:
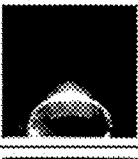
Figure 4:
Figure 4:
Figure 4:
Figure 4:
Figure 4:
Figure 5:
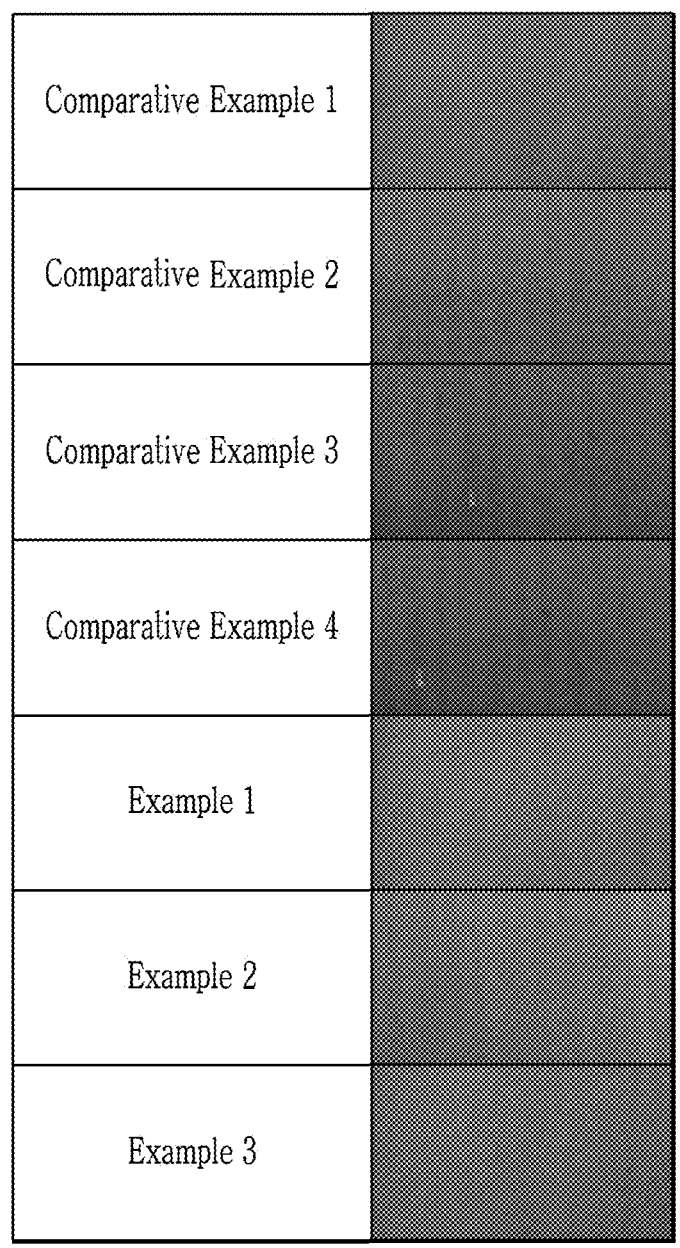
FIG. 5 illustrates visual images of spot levels according to Comparative Examples 1 to 4 and Examples 1 to 3.

Hereinafter, a drip spot of a liquid crystal composition according to an exemplary embodiment will be described with reference to FIG. 3. FIG. 4, and FIG. 5. FIG. 3 illustrates an image of spots that occur in a drip process of a liquid crystal composition, FIG. 4 illustrates images according to adsorption rates of each liquid crystal compound and self-aligned compound, and FIG. 5 illustrates visual images of spot levels according to Comparative Examples 1 to 4 and Examples 1 to 3.

Referring to FIG. 3, when the self-aligned compound is rapidly adsorbed to the substrate, the spreadability may be low in a process of dripping the liquid crystal composition onto a substrate. The self-aligned compound may be aggregated in some regions of the substrate to be visible as spots as shown in FIG. 3.

An adsorption rate and spreadability of the self-aligned compound according to time will be described with reference to FIG. 4 by adding the liquid crystal compounds represented by Chemical Formulas 1-1 to 1-7 as compared with a reference liquid crystal (Ref). In images shown in FIG. 4, portions indicated in black indicate that the self-alignment compound is adsorbed.

When the liquid crystal compounds represented by Chemical Formulas 1-4 to 1-7 are observed for about 20 minutes, it is seen that a region (indicated in white) where the self-aligned compound is not adsorbed is significant as compared with the liquid crystal compound represented by Chemical Formulas 1-1 to 1-3.

In contrast, it is seen that the liquid crystal compounds represented by Chemical Formulae 1-1 to 1-3 are indicated in black as a considerable amount of the self-aligned compound is adsorbed onto the substrate after about 20 minutes has passed.

It is seen that the liquid crystal compounds represented by Chemical Formulas 1-4 to 1-7 ameliorate the spreadability of the liquid crystal composition while reducing the adsorption rate of the self-aligned compound to the substrate as compared with the liquid crystal compounds represented by Chemical Formulas 1-1 to 1-3.

Accordingly, the liquid crystal composition according to an exemplary embodiment of the invention contains the liquid crystal compounds represented by Chemical Formulas 1-4 to 1-7 at a content that is higher than that of the liquid crystal compounds represented by Chemical Formulas 1-1 to 1-3. This is to prevent the self-aligned compound from being quickly adsorbed onto the substrate to be visible as spots.

Hereinafter, a content range of a liquid crystal composition according to an exemplary embodiment of the invention will be described with reference Table 2.

TABLE 2

| | 1 wt % | 3 wt % | 5 wt % | 7 wt % | 10 wt % | 12 wt % | 15 wt % | 20 wt % | 25 wt % | 30 wt % | 35 wt % | RV |
|---|---|---|---|---|---|---|---|---|---|---|---|---|
| CF 1-1 | X | O | O | O | O | O | O | O | O | — | — | 10-30 |
| CF 1-2 | X | O | O | O | O | O | O | O | O | — | — | 20-50 |
| CF 1-3 | X | X | X | X | X | O | O | O | O | — | — | 10-80 |
| CF 1-4 | X | X | X | X | X | X | X | X | X | — | — | 200-250 |
| CF 1-5 | X | X | X | X | X | X | X | X | X | — | — | 150-300 |
| CF 1-6 | X | X | X | X | X | X | X | X | X | — | — | 500-1000 |
| CF 1-7 | X | X | X | X | X | X | X | X | X | — | — | 70-150 |
| CF 1-8 | X | X | X | X | X | X | X | X | X | X | O | 10-30 |

In Table 2, "RV" indicates Rotational Viscosity, and "CF" indicates Chemical Formula. Referring to Table 2, in a case of the compound represented by Chemical Formula 1-1 and Chemical Formula 1-2, the drip spots are not visibly observed when contained at 1 wt % (indicated by X in Table 2), but the drip spots are visibly observed when contained at 3 wt % or more (indicated by O in Table 2). In addition, in a case of the liquid crystal compound represented by Chemical Formula 1-3, the drip spots are visibly observed when contained at more than 10 wt %. As a result, a content of the liquid crystal compound represented by Chemical Formula 1-1 may be 0 to 1 wt % of the entire liquid crystal composition, a content of the liquid crystal compound represented by Chemical Formula 1-2 may be 0 to 1 wt % of the entire liquid crystal composition, and a content of the liquid crystal compound represented by Chemical Formula 1-3 may be 3 to 10 wt % of the entire liquid crystal composition.

The liquid crystal compounds represented by Chemical Formulas 1-4 to 1-7 do not show the drip spot visibility depending on the content thereof. However, the compounds represented by Chemical Formulas 1-4 to 1-7 have a slightly high rotational viscosity. Since the liquid crystal composition according to the exemplary embodiment of the invention may have rotational viscosity of about 70 to about 150, the liquid crystal compounds represented by Chemical Formulas 1-4 to 1-7 may have a predetermined content within a range satisfying the rotational viscosity.

In addition, in a case of the liquid crystal compound represented by Chemical Formula 1-8, the drip spots are visibly observed at about 35 wt %. A content of the liquid crystal compound represented by Chemical Formula 1-8 may be about 3 to 30 wt %.

Hereinafter, visible images of spot levels of the liquid crystal composition according to Comparative Examples 1 to 4 and Examples 1 to 3 will be described with reference to Table 3 and FIG. 5.

Comparative Example 1 used a display device including the liquid crystal composition, the reactive mesogen, and the alignment layer illustrated in Table 1, and Comparative Examples 2 to 4 and Examples 1 to 3 used a display device including the liquid crystal composition, the self-aligned compound, and the reactive mesogen illustrated in Table 3. Comparative Examples 2 to 4 and Example 3 do not include an additional alignment layer. In Table 3, the compound represented by Chemical Formula 1-9 is as follows, and R and R' independently denote a C1 to C8 alkyl group, alkenyl group, or alkoxy group.

(Chemical Formula 1-9)

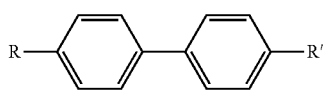

which the same liquid crystal composition as that of Comparative Example 1, the spot image exhibits level 2. In Comparative Example 3 and Comparative Example 4 in which a display device includes a liquid crystal composition, a reactive mesogen, and a self-aligned compound according to Table 3 but does not include an alignment layer, the spot image exhibits level 3.

In contrast, in Examples 1 to 3 in which a display device includes a liquid crystal composition, a reactive mesogen, and a self-aligned compound but does not include an alignment layer, the spot image exhibits level 1. In Examples 1 to 3, although an additional alignment layer is not provided, the spot image exhibits a level similar to that of Comparative Example 1 including an alignment layer by providing a liquid crystal composition.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A liquid crystal composition, comprising:
at least one liquid crystal compound selected from the group consisting of Chemical Formulas 1-1 to 1-8;
at least one self-aligned compound selected from the group consisting of Chemical Formulas 2-1 and 2-2; and
at least one reactive mesogen selected from the group consisting of Chemical Formulas 3-1 to 3-5:

(Chemical Formula 1-1)

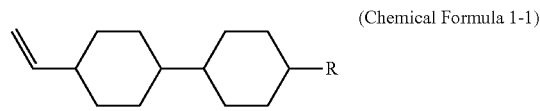

(Chemical Formula 1-2)

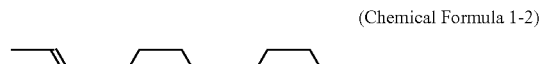

(Chemical Formula 1-3)

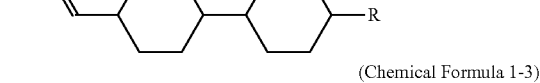

TABLE 3

|  | CE 1 | CE 2 | CE 3 | CE 4 | Example 1 | Example 2 | Example 3 |
|---|---|---|---|---|---|---|---|
| CF 1-8 (wt %) | 32 | 32 | 38.2 | 29.1 | 29.1 | 29.1 | 29.1 |
| CF 1-3 (wt %) | 9 | 9 | 8.2 | 17.3 | 8.2 | 8.2 | 8.2 |
| CF 1-4 (wt %) | 8 | 8 | 7.3 | 7.3 | 16.4 | 7.3 | 7.3 |
| CF 1-5 (wt %) | 10 | 10 | 9.1 | 9.1 | 9.1 | 18.2 | 9.1 |
| CF 1-6 (wt %) | 5 | 5 | 4.5 | 4.5 | 4.5 | 4.5 | 13.6 |
| CF 1-7 (wt %) | 22 | 22 | 20 | 20 | 20 | 20 | 20 |
| CF 1-9 (wt %) | 14 | 14 | 12.7 | 12.7 | 12.7 | 12.7 | 12.7 |
| Visual level | level 1 | level 2 | level 3 | level 3 | level 1 | level 1 | level 1 |

In Table 1, "CF" indicates Chemical Formula, and "CE" indicates Comparative Example. Referring to Table 3 and FIG. 5, when the liquid crystal composition including a predetermined liquid crystal composition and reactive mesogen is applied to a display device including an alignment layer according to Comparative Example 1, a spot image exhibits level 1. In contrast, in Comparative Example 2 in -continued (Chemical Formula 1-4)

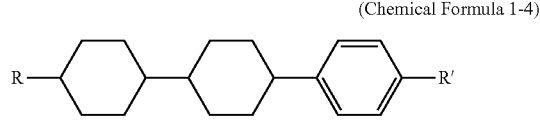

(Chemical Formula 1-5)

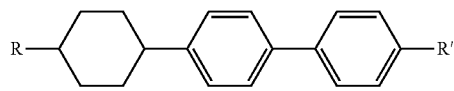

(Chemical Formula 1-6)

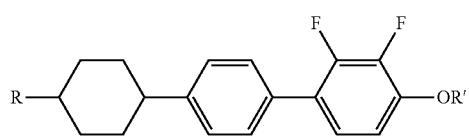

(Chemical Formula 1-7)

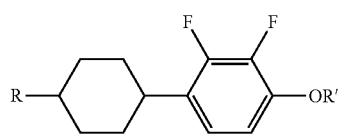

(Chemical Formula 1-8)

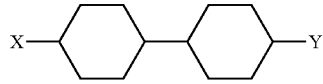

(Chemical Formula 2-1)

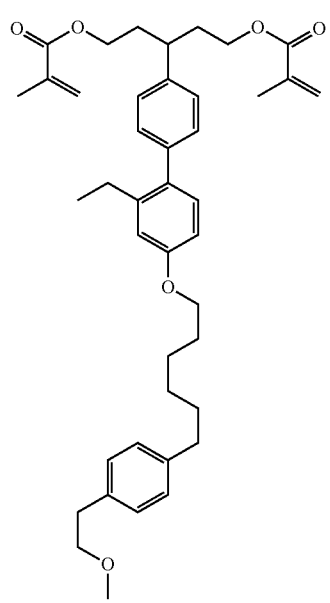

(Chemical Formula 2-2)

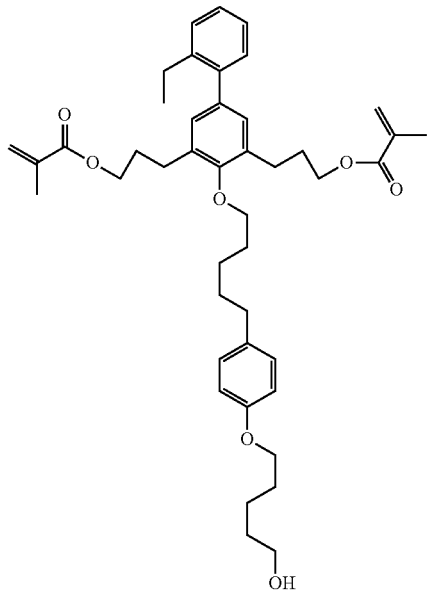

(Chemical Formula 3-1)

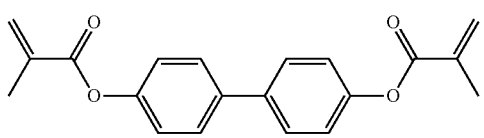

(Chemical Formula 3-2)

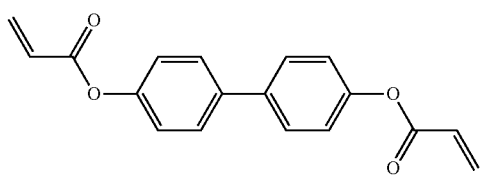

(Chemical Formula 3-3)

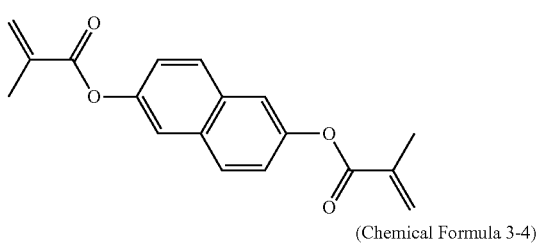

(Chemical Formula 3-4)

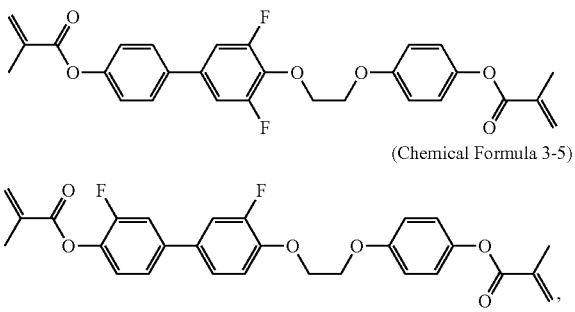

(Chemical Formula 3-5)

wherein R and R' independently denote a C1 to C8 alkyl group, alkenyl group, or alkoxy group in Chemical Formulas 1-1 to 1-7, and X and Y independently denote a C1 to C8 alkyl group in Chemical Formula 1-8.

2. The liquid crystal composition of claim 1, wherein:
a content of the liquid crystal compound represented by Chemical Formula 1-1 is 0 to 1 wt % of the entire liquid crystal composition,
a content of the liquid crystal compound represented by Chemical Formula 1-2 is 0 to 1 wt % of the entire liquid crystal composition,
a content of the liquid crystal compound represented by Chemical Formula 1-3 is 3 to 10 wt % of the entire liquid crystal composition,
a content of the liquid crystal compound represented by Chemical Formula 1-4 is 3 to 20 wt % of the entire liquid crystal composition,
a content of the liquid crystal compound represented by Chemical Formula 1-5 is 3 to 20 wt % of the entire liquid crystal composition,
a content of the liquid crystal compound represented by Chemical Formula 1-6 is 3 to 20 wt % of the entire liquid crystal composition,
a content of the liquid crystal compound represented by Chemical Formula 1-7 is 10 to 30 wt % of the entire liquid crystal composition, and
a content of the liquid crystal compound represented by Chemical Formula 1-8 is 3 to 30 wt % of the entire liquid crystal composition.

3. The liquid crystal composition of claim 1, wherein a content of the self-aligned compound is 0.05 wt % to 3 wt % of the entire liquid crystal composition.

4. The liquid crystal composition of claim 1, wherein a content of the reactive mesogen is 0.05 wt % to 3 wt % of the entire liquid crystal composition.

5. The liquid crystal composition of claim 1, wherein the liquid crystal composition has a refractive anisotropy of 0.08 to 0.13, a rotational viscosity of 70 to 150, and a dielectric anisotropy of −2.8 to −5.5.

6. The liquid crystal composition of claim 1, wherein the at least one liquid crystal compound is selected from the group consisting of Chemical Formulas 1-3 to 1-8.

7. The liquid crystal composition of claim 1, wherein an absolute value of average interaction energy between the self-aligned compound and one of the liquid crystal compounds represented by Chemical Formulas 1-1 to 1-3 is less than an absolute value of average interaction energy between the self-aligned compound and one of the liquid crystal compounds represented by Chemical Formulas 1-4 to 1-8.

8. The liquid crystal composition of claim 1, wherein an absolute value of average interaction energy between the self-aligned compound and one of the liquid crystal compounds represented by Chemical Formulas 1-1 to 1-3 is less than an absolute value of average interaction energy between the self-aligned compound and one of the liquid crystal compounds represented by Chemical Formula 1-4 and Chemical Formula 1-5.

9. A display device, comprising:
a first substrate and a second substrate configured to face and overlap each other; and
a liquid crystal layer disposed between the first substrate and the second substrate,
wherein the liquid crystal layer comprises:
at least one liquid crystal compound selected from the group consisting of Chemical Formulas 1-1 to 1-8;
at least one self-aligned compound selected from the group consisting of Chemical Formulas 2-1 and 2-2; and
at least one reactive mesogen selected from the group consisting of Chemical Formulas 3-1 to 3-5,
wherein an absolute value of an average interaction energy between the self-aligned compound and one of the liquid crystal compounds represented by Chemical Formulas 1-1 to 1-3 is less than an absolute value of an average interaction energy between the self-aligned compound and one of the liquid crystal compounds represented by Chemical Formulas 1-4 to 1-8:

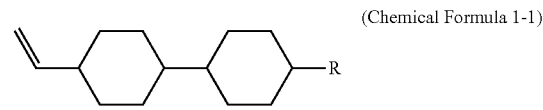

(Chemical Formula 1-1)

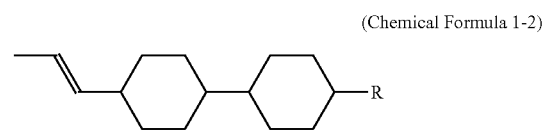

(Chemical Formula 1-2)

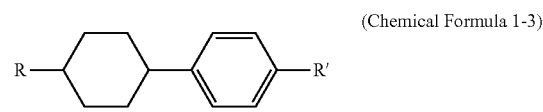

(Chemical Formula 1-3)

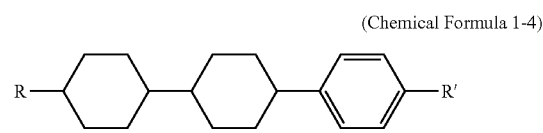

(Chemical Formula 1-4)

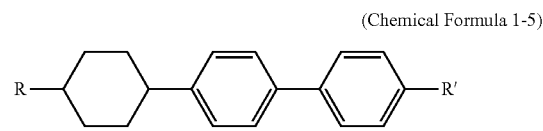

(Chemical Formula 1-5)

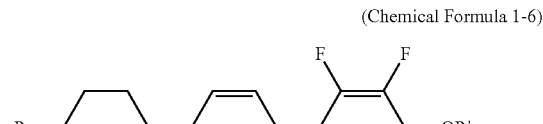

(Chemical Formula 1-6)

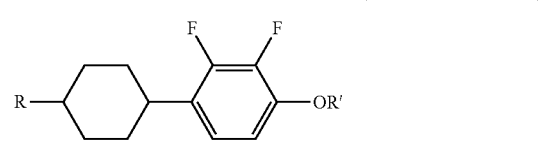

(Chemical Formula 1-7)

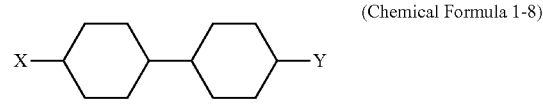

(Chemical Formula 1-8)

-continued (Chemical Formula 2-1)

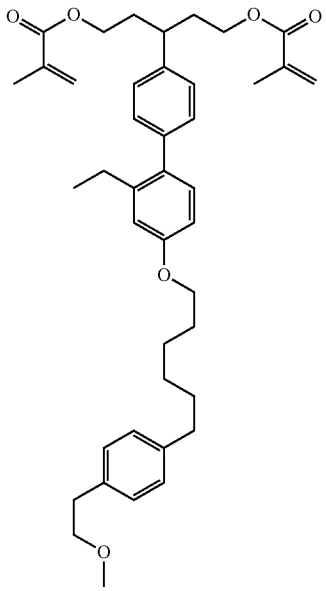

(Chemical Formula 2-2)

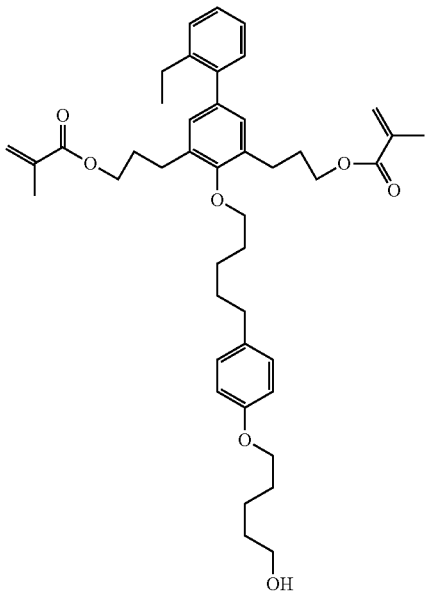

(Chemical Formula 3-1)

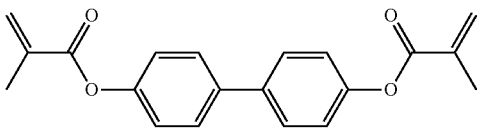

(Chemical Formula 3-2)

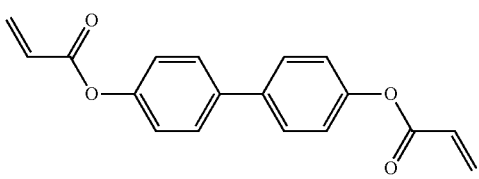

-continued (Chemical Formula 3-3)

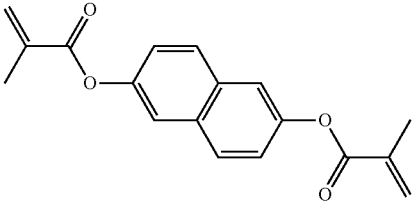

(Chemical Formula 3-4)

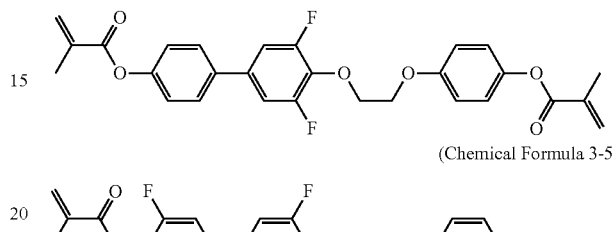

(Chemical Formula 3-5)

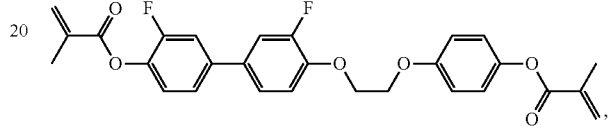

wherein R and R' independently denote a C1 to C8 alkyl group, alkenyl group, or alkoxy group in Chemical Formulae 1-1 to 1-7, and X and Y independently denote a C1 to C8 alkyl group in Chemical Formula 1-8.

10. The display device of claim 9, wherein the self-aligned compound is disposed between the first substrate and the liquid crystal layer and between the second substrate and the liquid crystal layer, to vertically align a plurality of liquid crystal molecules included in the liquid crystal layer.

11. The display device of claim 9, wherein the reactive mesogen is disposed between the first substrate and the liquid crystal layer and between the second substrate and the liquid crystal layer, to align a plurality of liquid crystal molecules included in the liquid crystal layer in an inclined manner with respect to a direction perpendicular to the first substrate.

12. The display device of claim 9, wherein for an entire liquid crystal composition of the liquid crystal layer:
a content of the liquid crystal compound represented by Chemical Formula 1-1 is 0 to 1 wt % of the entire liquid crystal composition,
a content of the liquid crystal compound represented by Chemical Formula 1-2 is 0 to 1 wt % of the entire liquid crystal composition,
a content of the liquid crystal compound represented by Chemical Formula 1-3 is 3 to 10 wt % of the entire liquid crystal composition,
a content of the liquid crystal compound represented by Chemical Formula 1-4 is 3 to 20 wt % of the entire liquid crystal composition,
a content of the liquid crystal compound represented by Chemical Formula 1-5 is 3 to 20 wt % of the entire liquid crystal composition,
a content of the liquid crystal compound represented by Chemical Formula 1-6 is 3 to 20 wt % of the entire liquid crystal composition,
a content of the liquid crystal compound represented by Chemical Formula 1-7 is 10 to 30 wt % of the entire liquid crystal composition, and
a content of the liquid crystal compound represented by Chemical Formula 1-8 is 3 to 30 wt % of the entire liquid crystal composition.

13. The display device of claim 9, wherein, for an entire liquid crystal composition of the liquid crystal layer, a content of the self-aligned compound is 0.05 wt % to 3 wt % of the entire liquid crystal composition.

14. The display device of claim 9, wherein, for an entire liquid crystal composition of the liquid crystal layer, a content of the reactive mesogen is 0.05 wt % to 3 wt % of the entire liquid crystal composition.

15. The display device of claim 9, wherein, for a liquid crystal composition of the liquid crystal layer, the liquid crystal composition has a refractive anisotropy of 0.08 to 0.13, a rotational viscosity of 70 to 150, and a dielectric anisotropy of −2.8 to −5.5.

16. The display device of claim 9, wherein the at least one liquid crystal compound is selected from the group consisting of Chemical Formulas 1-3 to 1-8.

17. The display device of claim 9, wherein an absolute value of average interaction energy between the self-aligned compound and one of the liquid crystal compounds represented by Chemical Formulas 1-1 to 1-3 is smaller than an absolute value of average interaction energy between the self-aligned compound and one of the liquid crystal compounds represented by Chemical Formula 1-4 and Chemical Formula 1-5.

18. The display device of claim 9, wherein an alignment layer is not disposed between the first substrate and the liquid crystal layer and is not disposed between the second substrate and the liquid crystal layer.

* * * * *